Jan. 9, 1945.  W. C. DOLCH  2,367,106
FLOW CONTROLLING VALVE
Filed April 5, 1943
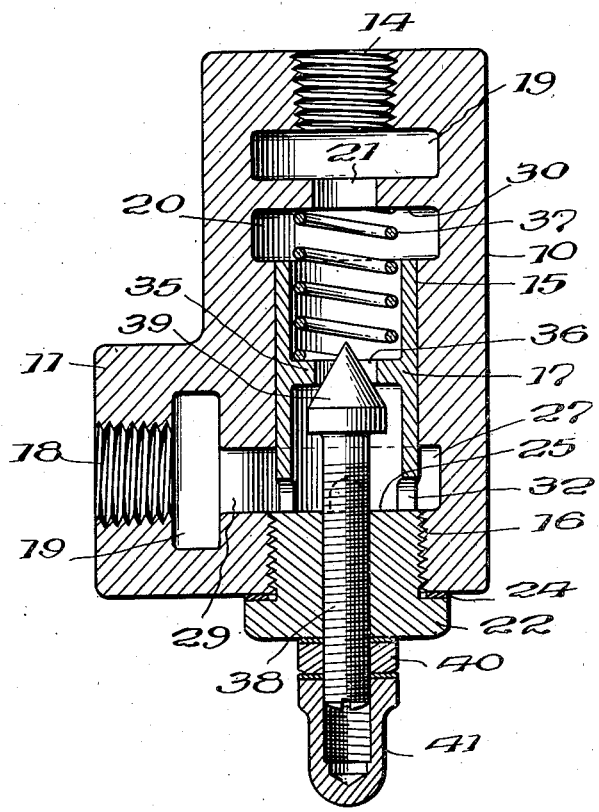
INVENTOR.
William C. Dolch
BY
Leech and Radue
ATTORNEY Patented Jan. 9, 1945

2,367,106

UNITED STATES PATENT OFFICE 2,367,106

FLOW CONTROLLING VALVE

William C. Dolch, Cleveland, Ohio, assignor to Hydraulic Control Engineering Company, Cleveland, Ohio, a corporation of Ohio Application April 5, 1943, Serial No. 481,893

7 Claims. (Cl. 251—144)

This invention relates to valves, and more particularly to valves for controlling the flow of fluid to and from hydraulic motors and the like.

It is a general object of the present invention to provide a novel and improved flow controlling valve.

More particularly, it is an object of the invention to provide a valve of the type described which always permits unrestricted flow of fluid in one direction through the same and which automatically restricts flow in the opposite direction in accordance with a predetermined setting.

An important feature of the invention resides in the arrangement of a ported reciprocable plunger within a suitable housing, which plunger is biased to a flow restricting position but adapted to be moved, solely under the action of fluid passing in one direction through the same, to provide for unrestricted flow.

A further important feature of the invention consists in the provision of a hollow tubular plunger provided with a central ported web performing the dual function of flow restriction and bias spring support.

Other and further important objects and features of the invention will be more apparent to those skilled in the art upon a consideration of the accompanying drawing and following specification wherein is disclosed a single exemplary embodiment of the same, with the understanding that such changes and modifications may be made therein as fall within the scope of the appended claims without departing from the spirit of the invention.

In said drawing the single figure is a longitudinal central section through a flow controlling valve constructed in accordance with the present invention, the sliding plunger being shown in the flow restricting position.

In the art of hydraulics it is often found desirable to provide for two-way flow of fluids, for instance, toward and from translating apparatus adapted to make use of the same. On many occasions it is desirable to provide unrestricted flow in one direction and to automatically restrict the rate of flow when the direction of flow is reversed. As a specific example, may be mentioned the delivery of high pressure hydraulic fluid from a pump or accumulator to a motor, hoist, or the like. When the translating device is performing work in lifting or moving a load, the flow of fluid to the same should be unrestricted, but when a load is being lowered and work is being done to the motor, a restriction in the return line for the fluid serves to retard the motion of the motor and prevent damage to equipment or material being handled.

In accordance with the present invention a simple flow restricting valve is provided which automatically opens to an unrestricted position for flow in one direction and returns to a restricted condition upon flow in the opposite direction. The degree of restriction is adjustable manually but when once set is always the same for each operation of the valve.

Referring now to the drawing for a better understanding of the invention, there is shown at 10 a valve housing or casing preferably formed by casting to a generally cylindrical shape provided with a lateral boss or protuberance 11 near one end of the same. The main cylindrical portion of the housing is provided with a straight-through passage from one end to the other composed principally of an opening 14, a straight cylinder chamber 15 of larger diameter than 14, and a threaded bore 16 of sufficiently large diameter to permit the insertion into the chamber portion 15 of the valve plunger 17. The boss 11 is provided with an opening 18 similar to that at 14 and suitably connected to the bottom of the chamber 15. The openings 14 and 18 are shown threaded to receive ordinary pipes but any other suitable form of connection may be substituted. The whole valve structure may be incorporated with other parts of a system in which case the housing 10 would be integral therewith and the openings 14 and 18 properly associated with passages for conducting the fluid to and from them.

At the inner end of the openings 14 and 18 are shown cored enlargements 19 primarily for the purpose of providing clearance for the ends of drills and taps used in finishing these openings. A similar cored portion 20 provides clearance for the drill and reamer forming the cylindrical chamber 15. Connecting the enlargement 20 and the one 19 directly above it is the passage 21 having its minimum area only slightly greater than the bores of the pipes leading to the openings 14 and 18.

The threaded bore 16 is closed by a suitable threaded plug 22 having a flanged head appropriately shaped to receive a wrench and to position a gasket 24 to insure against leakage around the threads. The inner end 25 of the plug is substantially flat and lies flush with the end wall of a cored chamber 27 forming an enlarged bottom for the cylindrical chamber 15. Chamber 27 is connected by a passage 29 with the chamber 19 and opening 18 where a continuous passage exists between openings 14 and 18 as shown.

The valve plunger 17 takes the form of a cylindrical tube having a close working fit in the chamber 15 and of such a length that it may have substantially reciprocal motion therein between the upper stop 30, comprising a shoulder between the outlet bore 14 and the chamber 15, and a bottom stop comprising the flat face 25 of the plug 22. The bottom edge of the sleeve or skirt of the plunger 17 is provided with a plurality of slots or notches 32 providing passages for fluid between the interior of the plunger sleeve and the chamber 27 where the sleeve is bearing on the bottom stop.

Substantially central of the length of the plunger it is partially closed by a web 35 having the center port 36 therethrough with a flow capacity at least equal to that of 21 and the bores of the connecting pipes. The web annulus surrounding the port forms one abutment for a light biasing spring 37 of helical form, the opposite end of which is abutted against the same shoulder 30 which provides the upper stop for the plunger. The spring being partially and closely housed in the plunger is limited in range and nicely centered.

The plug 22 is centrally bored and threaded to receive the threaded stem 38 carrying the enlarged conical head 39 adapted to adjustably cooperate with the walls of the port 36 in the plunger web to restrict the flow of fluid through the same when the latter enters at 14 and passes out through 18. The end of the stem 38 which projects beyond the plug is slotted to receive an adjusting tool and mounts the lock nut 40, the acorn nut 41 and appropriate gaskets or washers to prevent leakage.

In operation, the valve may be inserted, for instance, between a control valve connected both to a source of high pressure fluid and a reservoir for such fluid under low pressure and to a hydraulic hoist or motor. When fluid is being delivered to the hoist or motor it enters the valve through 18, passes through 29 into 27, through the notches 32 and bears against the annular web 35 lifting the valve plunger against the light biasing spring 37 and then flows freely through the port 36, the chamber 20, the passage 21 and out through the opening 14 to the motor. Under these conditions the flow is substantially unrestricted since the spring 37 is only of sufficient strength to insure returning the valve plunger against the bottom stop by overcoming friction in the bore 15. In the event that the valve is mounted in an inverted position, the spring must be strong enough to hold the plunger against the stop 25 when the valve is not passing fluid.

When the load on the hoist or motor is being lowered the fluid from the same under high pressure enters at 14 and leaves the valve housing at 18. Flow of this fluid acting on the plunger combined with the action of the spring returns the valve plunger to the position shown in the drawing where the flow of fluid is restricted, since it must pass through the annular area defined by the walls of the port 36 and the conical walls of the head 39. The area of this annulus can be adjusted by moving the head in or out by rotation of the stem 38 in an obvious manner. In an extreme condition the valve may be adjusted to act as a true check valve preventing any return flow from the motor to the reservoir, but this is not its primary intent.

When fluid is flowing through the valve in an unrestricted manner the plunger is held against the upper stop 30 and the port 36 is clear of the head 39. In the design of the valve it is desirable that the combined effective area of the notches 32 is always greater than the maximum area of the port 36 so that no secondary restriction can occur while oil is passing through these notches.

What I claim is:

1. In a flow controlling valve of the type described, in combination, a housing having a pair of spaced openings, a passage connecting said openings, a tubular valve member closely fitting but movable in said passage, fixed stops in the ends of said housing engageable by the ends of said member for limiting movement of the same in each direction, a spring to bias the member against one of said stops, a port extending longitudinally through said valve to provide a duct between said openings, a stem carried by the casing for cooperation with the said port when the member is biased against the stop to only partially close the port, said member being constructed to move away from said stop and stem to open said port wide under the action of fluid flowing in one direction, said stem being adjustable within limits to vary the extent of port opening without changing the range of movement of said valve between said stops.

2. In a flow controlling valve of the type described, in combination, a housing having a pair of spaced openings, a passage connecting said openings, a valve member closely fitting but movable in said passage, a portion of the housing forming a stop limiting movement of the member in one direction, a spring to bias the member against said stop with a fixed pressure, a port extending longitudinally through said valve member to provide a duct between said openings, a stem carried by the casing for cooperation with the said port when the member is biased against the stop to at least partially close the port, said member being constructed to move away from said stop and stem to open said port wide under the action of fluid flowing in one direction and means for adjusting said stem to vary the amount of said port restriction when the valve member is against said stop.

3. In a flow controlling valve of the type described, in combination, a housing having a pair of spaced openings, a passage connecting said openings, a valve member closely fitting but movable in said passage, a stop limiting movement of the member in one direction, a spring to bias the member against said stop, a port extending longitudinally through said valve member to provide a duct between said openings, a stem carried by the casing for cooperation with the said port when the member is biased against the stop to at least partially close the port, said member being constructed to move away from said stop and stem to open said port wide under the action of fluid flowing in one direction, means for adjusting said stem to vary the amount of said port restriction when the valve member is against said stop and a second stop limiting movement of the valve member away from said stem, each of said stops being arranged for cooperation with said valve member without restricting flow through the same.

4. In a flow controlling valve of the type described, in combination, a housing having a pair of spaced openings, a passage connecting said openings, a tubular valve member open at its ends and closely fitting but movable in said passage, one end of said housing forming a fixed stop limiting movement of the member in one direction, a light spring to bias the member against said stop, a transverse web intermediate the ends of said member to form an abutment for said spring, a port extending longitudinally through said web to provide a duct between said openings, a stem adjustably carried by the casing and extending into the end of said member opposite the spring for cooperation with only the said port when the member is biased against the stop to only partially close the port, said web presenting an area to fluid flowing in the valve from one of said openings to move the valve member against said bias to always open the said port wide, the spring tension remaining independent of the adjustment of the stem to change the closed position size of the port opening and means providing for passage of fluid between the interior of said member and the said opening at the stop end of the housing when the member is resting on said stop.

5. In a flow controlling valve of the type described, in combination, a housing having a pair of spaced openings, a passage connecting said openings, a tubular valve member open at its ends and closely fitting but movable in said passage, a fixed stop for engaging the open end of the tubular member and limiting movement of the member in one direction, a light spring to bias the member against said stop, a transverse web intermediate the ends of said member to form an abutment for said spring, a port extending longitudinally through said web to provide a duct between said openings, a stem carried by the casing and extending into the end of said member opposite the spring for cooperation with the said port when the member is biased against the stop to at least partially close the port, said web presenting an area to fluid flowing in the valve from one of said openings to move the valve member against said bias to open the said port wide, said stop comprising an end wall of said passage opposite one of said openings, the other opening extending laterally from the passage, and means for the passage of fluid to or from the lateral opening from or into the interior of the member when against said stop.

6. In a flow controlling valve of the type described, in combination, a housing having a pair of spaced openings, a passage connecting said openings, a tubular valve member open at its ends and closely fitting but movable in said passage, a fixed stop limiting movement of the member in one direction, a light spring to bias the member against said stop, a transverse web intermediate the ends of said member to form an abutment for said spring, a port extending longitudinally through said web to provide a duct between said openings, a stem carried by the casing and extending into the end of said member opposite the spring for cooperation with the said port only when the member is biased against the stop to at least partially close the port, said web presenting an area to fluid flowing in the valve from one of said openings to move the valve member against said bias to always open the said port wide, said stop comprising a plug threaded into an access opening in an end wall of said housing opposite one of said spaced openings, the other spaced opening extending laterally from the passage, said plug closed access opening being used for inserting the valve member, the said stem being mounted in said plug, and means preventing closure of the end of said valve member by said stop whereby flow is always permitted to said lateral opening.

7. In a flow controlling valve of the type described, in combination, a housing of generally cylindrical form having a lateral boss at one end, a passage extending through said housing from end to end and including a threaded opening for connection to a fluid system, a cylindrical bore of larger diameter and a plug receiving threaded opening of still greater diameter, a threaded opening in said boss intersecting the end of the bore adjacent said last mentioned threaded opening, a cylindrical plunger slidably mounted in said cylindrical bore and having a ported transverse web intermediate its ends, a spring bearing on said web and against a shoulder between the first threaded bore and the cylindrical bore, a flat-ended plug closing the passage and acting as a stop against which the spring biases the plunger, slots through the end of the plunger which cooperates with said stop, a stem threaded through said plug, a conical head on the stem positioned to cooperate with the port in said web to restrict flow therethrough from the first mentioned threaded opening to the opening in the boss, flow in the opposite direction being adapted to lift the plunger against the spring to separate the port from the stem head and provide unrestricted flow through the valve.

WILLIAM C. DOLCH.